(12) United States Patent
Wiseman

(10) Patent No.: US 12,130,921 B2
(45) Date of Patent: Oct. 29, 2024

(54) COMPUTER SECURITY

(71) Applicant: Deep-Secure Limited, Malvern (GB)

(72) Inventor: Simon Wiseman, Malvern (GB)

(73) Assignee: Everfox Ltd., Malvern (GB)

( * ) Notice: Subject to any disclaimer, the term of this patent is extended or adjusted under 35 U.S.C. 154(b) by 87 days.

(21) Appl. No.: 17/683,443

(22) Filed: Mar. 1, 2022

(65) Prior Publication Data

US 2022/0292193 A1     Sep. 15, 2022

(30) Foreign Application Priority Data

Mar. 11, 2021 (GB) ..................... 2103373

(51) Int. Cl.
    *G06F 21/56*     (2013.01)
    *G06F 21/55*     (2013.01)

(52) U.S. Cl.
    CPC .......... *G06F 21/565* (2013.01); *G06F 21/554* (2013.01); *G06F 21/564* (2013.01); *G06F 21/568* (2013.01)

(58) Field of Classification Search
    USPC .......................................................... 726/22
    See application file for complete search history.

(56) References Cited

U.S. PATENT DOCUMENTS

| | | | | |
|---|---|---|---|---|
| 10,243,977 B1 * | 3/2019 | Govindarajan | ..... | H04L 63/1416 |
| 10,997,294 B2 * | 5/2021 | Kenyon | ................ | G06F 21/564 |
| 11,216,559 B1 * | 1/2022 | Gu | ........................ | G06F 21/564 |
| 11,748,475 B1 * | 9/2023 | Berk | ..................... | G06F 21/564 |
| | | | | 726/22 |
| 2009/0282484 A1 | 11/2009 | Wiseman et al. | | |
| 2018/0218155 A1 * | 8/2018 | Grafi | ..................... | G06F 21/565 |
| 2018/0357421 A9 | 12/2018 | Grafi | | |
| 2019/0121978 A1 * | 4/2019 | Kraemer | ............... | G06F 21/565 |
| 2019/0138724 A1 * | 5/2019 | Stahlberg | .............. | G06F 21/554 |
| 2019/0268352 A1 | 8/2019 | Goh et al. | | |
| 2020/0210573 A1 * | 7/2020 | Chistyakov | ........... | G06F 21/561 |
| 2022/0129551 A1 * | 4/2022 | Collier | .................. | G06F 21/565 |

FOREIGN PATENT DOCUMENTS

| | | | | |
|---|---|---|---|---|
| CA | 2507940 A1 | | 11/2006 | |
| CA | 2648744 A1 * | | 11/2007 | ........... G06F 21/125 |
| CN | 101777062 A * | | 7/2010 | ........... G06F 21/562 |
| CN | 1924794 B * | | 3/2012 | ........... G06F 17/211 |
| CN | 108140084 A * | | 6/2018 | ........... G06F 16/152 |

* cited by examiner

*Primary Examiner* — Sakinah White Taylor
(74) *Attorney, Agent, or Firm* — Jackson Walker L.L.P.

(57) ABSTRACT

A computer-implemented method of mitigating the effect of a security threat present in a computer file of a known type. The method involves modifying the file to mitigate unsafe behaviour when the file is interpreted in accordance with the known type and/or in accordance with one or more different file types, and subsequently checking the modified file to ensure that it exhibits a known safe behaviour when interpreted according to the one or more different file types. The modified file may be checked to ensure it exhibits known safe behaviour when interpreted according to the one or more different file types. There may be two or more independent checks each according to one of the one or more different file types. The independent checks may be done in parallel. The step of modifying may include adding a damper to the file.

24 Claims, 2 Drawing Sheets

COMPUTER SECURITY

The present disclosure claims priority to United Kingdom Patent Application Serial No. 2103373.3, filed Mar. 11, 2021, which is incorporated by reference herein in its entirety.

TECHNICAL FIELD OF THE INVENTION

The present invention relates to computer security, and in particular to protecting computers and computer systems against malicious attacks by unsafe data such as computer viruses etc, and most particularly to mitigating the effect of unsafe data hidden within a computer file.

BACKGROUND TO THE INVENTION

Existing methods for protecting computers from attacks by unsafe data or malicious code contained within a file typically involve attempting to identify unsafe data in the file, for example by examining data in the file or by running the file in an isolated environment. Any unsafe data that is identified is then disrupted or removed from the file before the file can proceed to its destination or be used by the computer. These methods can be problematic as the disruption/removal process may not be completely successful, and the unsafe data, or its behaviour, must be known and identifiable. This can result in unsafe data that has not been encountered before being deemed safe and passing security checks, causing a security risk.

To alleviate these issues, US2009/0282484A1 discloses a method for mitigating the effects of a security threat involving unsafe data concealed in a computer file of a known file type. The method involves adding a damper to the file, the damper containing instructions which are ignored when interpreting the file according to the known file type, but cause the file to exhibit a known safe behaviour when interpreted according to one or more different file types. This can mitigate the effect of unknown unsafe data concealed within the file as the computer/computer process is prevented from processing the unsafe data by the damper without requiring knowledge of the unsafe data itself.

However, problems can arise when ensuring the file is safe according to many different file formats, as multiple independent checks comprising identifying and removing unsafe data must be done sequentially, this can increase the time taken to process a file significantly. Furthermore, where dampers are added, each security check in the sequence may deem that a damper added by an earlier security check is itself unsafe data and attempt to remove or disrupt it. This can reduce the chance of effective dampers being added to the file, and can lead to additional unsafe data being created.

It is an object of embodiments of the present invention to at least partially overcome or alleviate the above problems.

SUMMARY OF THE INVENTION

According to a first aspect of the present invention there is provided a computer-implemented method of mitigating the effect of a security threat present in a computer file of a known type, the method comprising:
  a. modifying the file to mitigate unsafe behaviour when the file is interpreted in accordance with the known type and/or in accordance with one or more different file types; and
  b. subsequently checking the modified file to ensure that it exhibits a known safe behaviour when interpreted according to the one or more different file types.

Thus, embodiments of the present invention provide for a more robust and efficient method of mitigating the effects of unsafe data in computer files, even when the computer file is interpreted according to many different file types. As the file is first modified and then checked, further modifications to the file after any one checking step are not required and this ensures both that: the checks need only be performed once; the modifications are effective and are less likely to conflict with one another and the checking processes; and, that the results of the checking are indicative of the file before it is used by the computer.

Furthermore, as checking is done after modifications, all the checks according to the one or more different file types may be conducted in parallel, which optimises computing efficiency, increasing the speed of the security check. Accordingly, the step of modifying may be independent of the step of checking.

The checks are also individually very quick to complete as they are looking for a predictable known safe behaviour, rather than checking the file against a wide range of unsafe behaviours.

As the step of checking is conducted according to the one or more different file types, checking according to each of the different file types may act differently from each other, and from any check according to the known file type. Thus, each check may be independently developed according to a different file type or computer code and this reduces the risk of vulnerabilities being introduced into one type of check and then being copied into all other checks. Furthermore, this eliminates the need for the time consuming and resource intensive task of attempting to sequentially identify and remove unsafe data according to several different unknown file types.

The step of modifying the file may comprise adding data to and/or removing data from the file. The method may comprise adding data to the file which causes the file to exhibit a known safe behaviour, or one of a set of known safe behaviours. The method may comprise adding data to the file which causes the file to exhibit a known safe behaviour, or one of a set of known safe behaviours, when interpreted according to the known file type. The method may comprise adding data to the file which causes the file to exhibit a known safe behaviour, or one of a set of known safe behaviours, when interpreted according to one or more different file types. The file is modified to ensure that it behaves in a safe manner as any unsafe data hidden within the file is prevented from being processed, regardless of the file type the file is interpreted as. For example, where the unsafe data is a program or script, the file may be modified to prevent the program or script from being executed. The file may also be modified to prevent unsafe data from being processed during file operations such as opening/closing a file, or compressing data into a ZIP file; or communications and data processing tasks such as completing bank transactions, sending email, or the like. Further only one of a set of safe behaviours is required, and not necessarily a specific safe behaviour (although some embodiments may only implement one safe behaviour), thus the modification is simpler to implement. Furthermore, as the modifications are all completed before checking, checking accurately assess the effectiveness of all modifications and ensures the modifications do not interfere with each other in a way that causes the file, or parts of it, to exhibit unsafe behaviour when processed by the computer or a computer process.

The method may comprise adding a damper to the file, wherein the damper is configured to be processed before at least part of the file. The damper may comprise data that is ignored when interpreting the file according to the known file type. Thus, dampers can be effectively used at the start of the file to ensure a known safe behaviour is exhibited when the file is interpreted according to different file types without changing the normal interpretation of the file according to the known file type.

The damper may comprise data that is not ignored when interpreting the file according to the known file type. The damper may comprise information that confirms the damper has been added to the file when interpreting the file according to the known file type. The information may depend on the known file type, for example: where the known file type is a text file, the information may generate a line of text at the start of the document; and where the known file type is an image, the information may generate a watermark on the image. Thus, the user can easily identify if a file has been processed and security threats within it mitigated.

The step of modifying may comprise making a series of sequential modifications to the file. Each sequential modification may comprise modifying the file to mitigate unsafe behaviour according to one of the one or more different file types. Thus, simple sequential modifications can be used to mitigate unsafe behaviour and all sequential modifications may be completed before checking. As such, any unsafe interactions between the sequential modifications that may inadvertently affect the interpretation of the file and cause unsafe behaviour are detected.

The method may be repeated to check multiple files. Each time the method is repeated, the size and/or length of data added to the file may be changed. Thus, the actual length/size of the data added to the file changes before it is added to the file and is therefore harder to predict and disrupt.

The known safe behaviour may comprise preventing further processing of the file. The known safe behaviour, or the set of known safe behaviours, may comprise indefinitely pausing processing of the file, stopping processing of the file, or entering an infinite loop during processing of data added to the file. In the context of a ZIP file, the known safe behaviour may be that when interpreted as a ZIP file, the file appears to be empty. Thus, the known safe behaviour ensures any unsafe data in the file is not processed by the computer/computer process.

The step of checking may comprise two or more independent checks, wherein each independent check corresponds to checking the file according to one of the one or more different file types. The step of checking may comprise performing two or more independent checks in parallel and/or in series. As the checking is performed after any modifications, the step of checking can be performed in parallel if required. This ensures computational efficiency is maximised and the processing time required for checking the file is reduced. Furthermore, each independent check may work independently of the others, and also may be developed/built independently of the others, reducing the risk of a security vulnerability in one independent check being copied into the others in error.

Two or more of the independent checks may relate to the same different file type. Thus, additional redundancy and security in checking the interpretation of the file according to each different file type can be obtained.

The file may be deemed safe when all independent checks deem the file to be safe. Thus, the checks ensure the file is safe when interpreted according to any one of the known file type or the one or more different file types.

The step of checking the file may comprise checking only part of the file, or a subset of the file, or a subset of the data contained within the file. As the step of checking only needs to verify the data added to the file is operating correctly, flaws in this can be exposed without checking the entire file. This increases the efficiency and performance of the checking process.

The step of checking may be conducted in parallel with, or after, delivery of the computer file for use by the computer. The step of checking may be conducted in parallel with, or after, delivery of the computer file for use by the computer according to the known file type. As no further modification of the file is required after checking, the checking steps can be conducted separately from the delivery of the file. Thus, the file may be delivered and used according to the known file type while checks are conducted to ensure it is safe according to the one or more different file types. The file can then be recalled if it is deemed unsafe, and before it is likely to have been misinterpreted according to the one or more different file types.

The step of checking may comprise checking the modified file to ensure it exhibits any one or more of a set of known safe behaviours. Thus, if the file exhibits a known safe behaviour it is deemed safe, irrespective of whether the known safe behaviour was the one intended by the earlier modification of the file. This improves the efficiency of the process as the modification process need only ensure that any of a number of known safe behaviours are highly likely, it is not required that the modifications ensure a specific safe behaviour.

The step of modifying the file may comprise the steps of detecting unsafe data in the file, and disrupting or removing the unsafe data from the file. The step of detecting may comprise detecting unsafe data according to the known file type. The step of detecting may not comprise detecting unsafe data according to the one or more different file types. The step of detecting may comprise identifying executable data embedded within the file. The method may comprise verifying that detected unsafe data has been successfully removed from the file, or disrupted. Thus, data which is known to be unsafe can be proactively removed from the file. This can improve the effectiveness of dampers added to the file. As the step of detecting is only conducted in relation to the known file type and not the different file types, this process does not significantly add to the computation time required for mitigating security threats in the file.

The step of modifying the file comprises the steps of disrupting or removing data from the file that is deemed unsafe, and subsequently adding data to the file which causes the file to exhibit a known safe behaviour. Accordingly, in some embodiments the method comprises:

a. detecting unsafe data in the file according to the known file type;
b. then, modifying the file by first disrupting or removing identified unsafe data according to the known file type, and second adding data to the file which causes the file to exhibit a known safe behaviour when interpreted according to one or more different file types; and,
c. finally, checking the modified file to ensure that it exhibits any one behaviour from a set of known safe behaviours when interpreted according to the one or more different file types.

This advantageously ensures that the checking step can determine if the combined effect of all modifications results in the known safe behaviour, for example that any addition or removal of data does not erroneously remove or disrupt data added to the file, and secondly that no data is added or removed from the file after the checking process, ensuring the result of the checks according to the one or more different file types is reliable.

The one or more different file types may comprise file types according to any one or more of: a document file format; an executable file format; or a scripting language. The known and/or different file type(s) may be a type of document file format, such as a mark-up language, page description language, or any one of: plain text file; rich text format; extensible markup language; JavaScript® object notation; graphics interchange format; JPEG; bitmap; encapsulated postscript; portable document format; Microsoft (RTM) Office document; or Microsoft (RTM) Word document. The step of checking may comprise checking the file exhibits a known safe behavior when interpreted according to one or more executable file formats or scripting languages, for example: command script; PowerShell (RTM); JavaScript® python python®; C#; C++; etc. Thus, the file is safe when interpreted according to a very wide range of file types and scripting languages.

According to a second aspect of the present invention, there is provided a computer program comprising instructions which, when the program is executed by a computer, cause the computer to carry out the method of the first aspect of the present invention.

The computer program of the second aspect of the present invention may incorporate any one or more of the features of the method of the first aspect of the present invention as required or desired.

According to a third aspect of the present invention there is provided a computer-readable storage medium having stored thereon the computer program of the second aspect of the present invention.

The computer-readable storage medium may be any suitable storage medium such as: a hard disk drive; a solid state hard drive; flash memory; random access memory; read only memory; or the like.

According to a fourth aspect of the present invention there is provided a data processing device comprising a processor configured to perform the method of the first aspect of the present invention.

The data processing device may be any of: a computer; a server; network equipment such as a router or firewall; a mobile computing device such as a mobile phone, tablet or notebook computer; a wearable device such as a smart watch; an internet-of-things device; or the like.

The data processing device may comprise a processor. The data processing device may comprise an electric power supply. The data processing device may comprise a user interface. The user interface may be any suitable user interface such as a touch screen display, a display, a mouse, a keyboard, etc. The user interface may be configured to receive control inputs from a user and thereby control the processor.

The data processing device may comprise a computer-readable storage medium. The computer-readable storage medium may be the computer-readable storage medium of the third aspect of the present invention.

The processor may be in communication with the user interface and the computer-readable storage medium. The processor may be configured to read the instructions stored on the computer-readable storage medium. The processor may be configured to carry out the method of the first aspect of the present invention on a computer file in response to the computer file being opened or selected by a user of the data processing device. Alternatively, or in addition, the processor may be configured to carry out the method of the first aspect of the present invention on a computer file in response to the file being interacted with by the processor, for example being opened, copied, saved, etc.

The data processing device may comprise one or more processing devices in communication with one another. Each processing device may be configured to carry out one or more of the steps of the method of the first aspect of the present invention. One or more processing devices may each be a modifier configured to modify a computer file. Each modifier may comprise a processor. One or more processing devices may each be a verifier configured to verify modifications made to a computer file. Each verifier may be implemented in hardware logic. The step of modifying of the first aspect of the present invention may be split among two or more modifiers. Thus, the performance of the method can be split amongst different devices to ensure efficient and secure modification and checking of a computer file.

BRIEF DESCRIPTION OF THE DRAWINGS

In order that the invention may be more clearly understood one or more embodiments thereof will now be described, by way of example only, with reference to the accompanying drawings, of which.

DETAILED DESCRIPTION OF THE INVENTION

Figure 1:
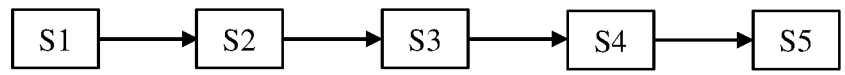
FIG. 1 is a flow diagram for a method of mitigating the effect of a security threat in a computer file.

Referring to FIG. 1, an embodiment of a computer-implemented method for mitigating the effect of a security threat in a computer file (referred to as "the file") of a known type comprises steps S1-S5.

In step S1, the file is examined to identify unsafe data according to the known file type. Step S1 is performed according to known methods of identifying malicious code or unsafe data, for example examining the file to try and identify embedded executable code within the file, or processing the file in an isolated computer environment and observing the behaviour of the file.

In step S2, any unsafe data that is identified in S1 is removed from the file, or the file is otherwise modified to ensure the operation of the unsafe data is disrupted so that it cannot pose a security risk.

In step S3, a damper is added to the file to ensure the file exhibits a known safe behaviour when interpreted according to one or more different file types to the known file type. The process of adding a damper is described in US2009/0282484A1, and includes adding instructions to the start of the file to ensure that when the file is interpreted, any unsafe data in the file is not processed. Advantageously, the damper does not require prior knowledge of the nature of the unsafe data, or its expected output, in order to prevent unsafe data from being processed.

In step S4, the file is checked to ensure that the file exhibits a known safe behaviour when interpreted according to the one or more different file types.

In this embodiment, the known safe behaviour when interpreted according to the one or more different file types may be any known set of safe behaviours, thus the method does not require step S3 to ensure a specific known behaviour is exhibited, just that it is highly likely that one of the set of known safe behaviours is exhibited. Any suitable known safe behaviour could be used in the set of known safe behaviours, but in general it should have the effect that processing of any unsafe data contained within the file is disrupted or prevented. For example, the known safe behaviour may comprise an infinite loop from which the computer/computer process cannot escape, or an exit command to halt/exit processing of the file.

In step S5, the file is deemed safe if all the checks performed in step S4 are completed successfully.

In some embodiments, the file may be delivered for use by the computer or user once it has been checked according to the known file type. Checks according to the one or more different file types can be conducted in parallel with the use of the file according to the known file type. This reduces the time for delivery of the file to the user/computer, and does not significantly increase security risks as the final checks are conducted quickly and before any great risk of interpretation of the file according to the different file types.

Figure 2:
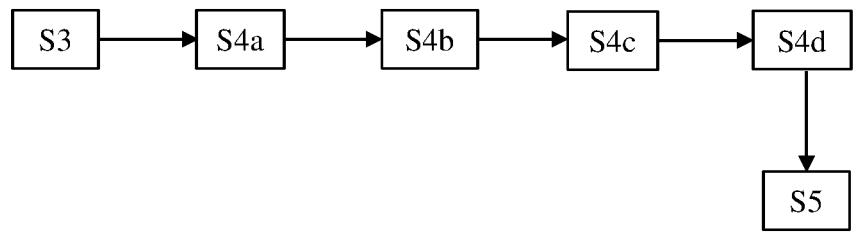
FIG. 2 is a flow diagram for a method of checking a file exhibits a known safe behaviour according to one or more different file types in series.
Figure 3:
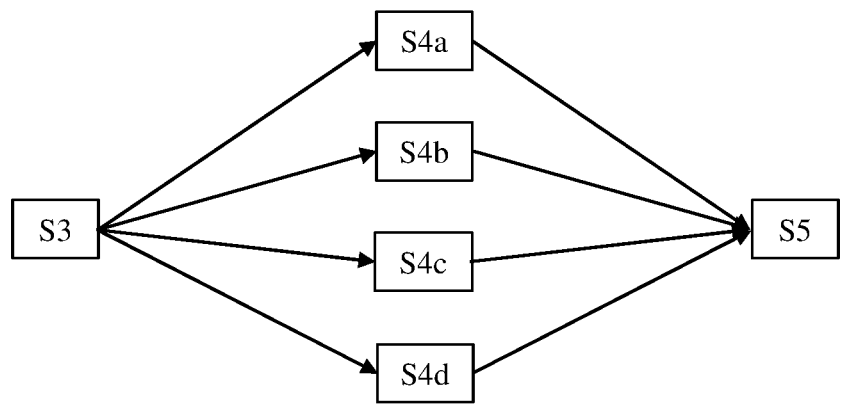
FIG. 3 is a flow diagram for a method of checking a file exhibits a known safe behaviour according to one or more different file types in parallel.

Referring to FIGS. 2 and 3, in embodiments where there are two or more different file types, the step S4 may comprise two or more independent checks S4a-d that the file exhibits a known safe behaviour. Each independent check S4a-d corresponds to the behaviour of the file when interpreted according to a different one of the two or more different file types. In these embodiments, step S5 may involve collecting the results of each independent check and then deeming the file safe if all independent checks deem the file to be safe. Alternatively, or in addition, the checking may proceed until any one independent check fails, causing the checking process to be abandoned and the file marked as unsafe. In this way, if the file does not exhibit a known safe behaviour according to any one different file type then it is deemed unsafe.

By way of example there may be four different file types, and four associated independent checks S4a-d. Referring to FIG. 2, in some embodiments, the independent checks may be conducted in series, that is, a first check S4a according to a first different file type, then a second check S4b, a third check S4c and a fourth check S4d according to a second, a third and a fourth different file type respectively.

Referring to FIG. 3, alternatively or in addition, some of the independent checks may be conducted in parallel. For example, the first to fourth checks S4a-d may all be conducted in parallel. In this example, each of the first to fourth checks S4a-d vote on whether the file exhibits the required safe behaviour. If any one check votes that the file is not safe, the file will be deemed unsafe at step S5. This parallel processing has the advantage that computational time is saved as opposed to conducting the checks in series.

In some embodiments, two or more independent checks may relate to the same different file type. This can be used to increase the reliability of the checking process. For example, such an embodiment may comprise two different file types and four independent checks. Two independent checks may therefore be assigned to each different file type, or in some circumstances, three independent checks may be assigned to one different file type, and one independent check to the other different file type.

Figure 4:
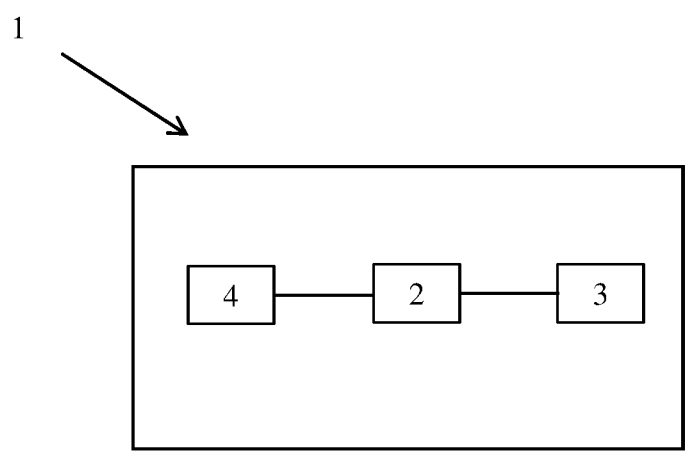
FIG. 4 is a computer configured to perform a method of mitigating the effect of a security threat in a computer file.

Referring to FIG. 4 a data processing device comprises a processor 2, a computer-readable storage medium 3, and a user interface 4. In this embodiment, the data processing device is a computer 1, and the computer 1 further comprises an electric power supply (not shown). The computer-readable storage medium 3 may be any suitable type of storage medium such as a hard disk drive, solid state drive, flash memory or the like. The user interface 4 may be any suitable user interface for a computer such as a touch screen display, mouse, keyboard, etc. In this embodiment, the user interface 4 is a touch screen display configured to allow a user (not shown) to control the operation of the processor 2.

The computer-readable storage medium 3 stores files that a user may wish to access, such as a text document stored as a rich text format (rtf) file, as well as a computer program, the computer program comprising instructions to carry out the method of steps S1 to S5 for mitigating the effect of a security threat in a computer file as described above.

As such, a user may control the processor 2 via the user interface 4 to open the rtf file. In response, the processor 2 is configured to access the computer program stored on the storage medium 3 and carry out the method of steps S1 to S5 on the rtf file, thus mitigating any unsafe data that may be held within the file. Assuming the checking in steps S4-S5 is completed successfully, the rtf file can then be opened safely used by the user. If any one check in S4-S5 fails, the user is prevented from opening the potentially unsafe file.

As described above, embodiments of the present invention provide for a more robust and efficient method of mitigating the effects of unsafe data in computer files. Dampers are added simultaneously to a computer file to ensure that when it is interpreted according to any of several different file types, it always exhibits safe behaviour. This ensures it is safe, even if the file extension is changed and it is erroneously interpreted as a different type of file.

Checking of the effectiveness of the dampers added to the file is conducted after all dampers have been added, this means all the checks can be conducted in parallel, which saves on computing time and file access speed. It also ensures that the file is not modified after checking, which increases the reliability of the checking results and detects for unintended changes made during the modification process which have prevented the file from exhibiting safe behaviour.

Furthermore in some embodiments, removal of unsafe data is only conducted in relation to the known file type of the file and not the one or more different file types, this also increases the speed of the process.

By way of an example, in one embodiment, the method may be applied to mitigate a security threat in a test file written in the rtf format. The test file may contain the following text (line numbers in parenthesis):
(1) {\rtf1
(2) notepad test.txt
(3) \par
(4) This is a test.\par
(5)}

When interpreted according to the rtf format, the output is as follows:
notepad test.txt
This is a test.

However, the test file may also be interpreted as a Command Script. Line (1) of the test file "{\rtf1" is not a valid command, so execution of the test file as a Command Script ignores this line. Line (2) "notepad test.txt" is a valid command that, by way of example, would open the test.txt file using the Notepad application. However, in other examples this may be replaced with malicious code.

In this embodiment, the method begins at step S3, and a damper is added to the test file to ensure the test file exhibits a known safe behaviour when interpreted as a Command Script. The modified test file now contains:

(1) {\rtf1 {\*\damper
(2) exit
(3)}
(4) notepad test.txt
(5) \par
(6) This is a test.\par
(7)}

When the modified test file is interpreted as a Command Script, once again, line (1) is ignored as it refers to a file whose name contains an asterisk. The second line is now an exit statement that causes the script to immediately terminate. This means that any malicious code that follows will not be executed. Furthermore, the sequence "{\*\damper exit}" in lines (1) to (3) has no effect when interpreted as an RTF file, so the normal interpretation of the file according to the known file type, an RTF file, is unchanged.

In step S4, the modified test file is checked to ensure the file exhibits a known safe behaviour. By way of example, the check may be represented in pseudocode as follows:

For each line in the file
   If the line starts with a known safe command
     Continue checking
   If the line starts with "exit"
     Report safe
   Else
     Report unsafe Thus, the file is executed during step S4 and is reported as safe if the file contains an "exit" command preceded only by other known safe commands (such as a line containing an invalid file name).

The one or more embodiments are described above by way of example only. Many variations are possible without departing from the scope of protection afforded by the appended claims.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

The invention claimed is:

1. A computer-implemented method of mitigating the effect of a security threat present in a computer file, the method comprising:
  a. identifying a known file type for the computer file, wherein the computer file is of the known file type;
  b. generating a list of one or more different file types to the known type, wherein the computer file is not of each of the one or more different file types;
  c. modifying the file to mitigate unsafe behavior when the file is interpreted in accordance with the known file type or in accordance with the one or more different file types to the known file type; and
  d. subsequently checking the modified file to ensure that the modified file exhibits a known safe behavior when interpreted according to the one or more different file types to the known file type,
    wherein the step of checking comprises, for each respective file type in the list of one or more different file types to the known file type, determining a future behavior of the file when, in future, the file is interpreted according to that respective file type, wherein the computer file is not of each respective file type,
    and wherein the modified file is only deemed safe when each future behavior of the file is determined to be a known safe behavior.

2. The method as claimed in claim 1 wherein the step of checking comprises checking the modified file to ensure it exhibits any one known safe behavior from a set of known safe behaviors when interpreted according to the one or more different file types.

3. The method as claimed in claim 1 wherein the step of checking the file comprises inspecting only a part of the contents of the file to determine, for each respective file type of the one or more different file types to the known file type, the future behavior of the file when, in future, the file is interpreted according to that respective file type.

4. The method as claimed in claim 1 wherein the step of checking comprises two or more independent checks, wherein each independent check corresponds to checking the file according to one of the one or more different file types.

5. The method as claimed in claim 4 wherein the file is deemed safe when all independent checks deem the file to be safe.

6. The method as claimed in claim 4 wherein the step of checking comprises performing two or more independent checks in parallel.

7. The method as claimed in claim 1 wherein the step of checking is conducted in parallel with, or after, delivery of the computer file for use by the computer.

8. The method as claimed in claim 1 wherein the step of modifying comprises adding data to the file which causes the file to exhibit a known safe behavior.

9. The method as claimed in claim 1 wherein the step of modifying comprises adding data to the file which causes the file to exhibit a known safe behavior, or one of a set of known safe behaviors, when interpreted according to the one or more different file types.

10. The method as claimed in claim 9 wherein the known safe behavior, or the set of known safe behaviors, comprises indefinitely pausing processing of the file, stopping processing of the file, or entering an infinite loop during processing of data added to the file.

11. The method as claimed in claim 1 wherein the step of modifying comprises adding a damper to the file, wherein the damper is configured to be processed before at least part of the file.

12. The method as claimed in claim 11 wherein the damper comprises data that is ignored when interpreting the file according to the known file type.

13. The method as claimed in claim 1 wherein the known safe behavior comprises preventing further processing of the file.

14. The method as claimed in claim 1 wherein the step of modifying the file comprises the steps of detecting unsafe data in the file, and disrupting or removing the unsafe data from the file.

15. The method as claimed in claim 14 wherein the step of detecting comprises detecting unsafe data according to the known file type.

16. The method as claimed in claim 14 wherein the step of detecting does not comprise detecting unsafe data according to the one or more different file types.

17. The method as claimed in claim 1 wherein the step of modifying the file comprises the steps of disrupting or removing data from the file that is deemed unsafe, and subsequently adding data to the file which causes the file to exhibit a known safe behavior.

18. The method as claimed in claim 1 wherein the step of checking comprises checking the file exhibits the known safe behavior when interpreted according to one or more scripting languages.

19. The method as claimed in claim 1 wherein the one or more different file types comprise file types according to any one or more of: a document file format; an executable file format; or a scripting language.

20. The method as claimed in claim 1 wherein the method comprises the steps of:
  a. detecting unsafe data in the file according to the known file type;
  b. then, modifying the file by first disrupting or removing identified unsafe data according to the known file type, and second adding data to the file which causes the file to exhibit a known safe behavior when interpreted according to one or more different file types; and,
  c. finally, checking the modified file to ensure that it exhibits a known safe behavior when interpreted according to the one or more different file types.

21. A computer program comprising instructions which, when the program is executed by a computer, cause the computer to carry out the method as claimed in claim 1.

22. A computer-readable storage medium having stored thereon the computer program of claim 21.

23. The method of claim 1 wherein the modified file is only deemed safe if the future behavior is provided by commands inside the modified file.

24. A computer-implemented method of mitigating the effect of a security threat present in a computer file, the method comprising:
  a. identifying a known file type for the computer file, wherein the computer file is of the known file type;
  b. generating a list of two or more different file types to the known type, wherein the computer file is not of each of the two or more different file types;
  c. modifying the file to mitigate unsafe behavior when the file is interpreted in accordance with each of the two or more different file types in the list; and
  d. subsequently checking the modified filed to ensure that the modified file exhibits a known safe behavior when interpreted according to each of the two or more different file types in the list,
  wherein the step of checking comprises, for each respective file type in the list of two or more different file types to the known file type, determining a future behavior of the file when, in future, the file is interpreted according to that respective file type, wherein the computer file is not of each respective file type,
  and wherein the modified file is only deemed safe when each future behavior of the file is determined to be a known safe behavior.

* * * * *